(12) United States Patent
Feinsod et al.

(10) Patent No.: US 7,312,863 B2
(45) Date of Patent: Dec. 25, 2007

(54) MOTION-COMPENSATING LIGHT-EMITTING APPARATUS

(76) Inventors: Matthew Feinsod, 4F Nassau Dr., Great Neck, NY (US) 11021; Michael Perlmutter, 19 Peckham Hill Rd., Sherborn, MA (US) 01770

( * ) Notice: Subject to any disclaimer, the term of this patent is extended or adjusted under 35 U.S.C. 154(b) by 94 days.

(21) Appl. No.: 11/022,215

(22) Filed: Dec. 23, 2004

(65) Prior Publication Data

US 2006/0139923 A1   Jun. 29, 2006

(51) Int. Cl.
  *G01C 1/10*   (2006.01)
  *G01J 1/20*   (2006.01)
(52) U.S. Cl. .................... 356/149; 250/201.1
(58) Field of Classification Search ............ 356/149; 359/554–557; 250/201.1, 234, 206.1, 235
See application file for complete search history.

(56) References Cited

U.S. PATENT DOCUMENTS

| | | | | |
|---|---|---|---|---|
| 3,781,121 A | * | 12/1973 | Gross | 356/247 |
| 4,108,551 A | * | 8/1978 | Weber | 356/4.01 |
| 4,701,602 A | * | 10/1987 | Schaefer et al. | 250/201.1 |
| 5,368,271 A | * | 11/1994 | Kiunke et al. | 248/638 |
| 6,288,381 B1 | * | 9/2001 | Messina | 250/201.1 |
| 6,359,681 B1 | * | 3/2002 | Housand et al. | 356/141.3 |
| 6,653,611 B2 | * | 11/2003 | Eckelkamp-Baker et al. | 250/201.1 |
| 6,700,109 B2 | * | 3/2004 | Eckelkamp-Baker et al. | 250/203.1 |
| 2004/0182997 A1 | * | 9/2004 | Green | 250/227.14 |
| 2005/0128749 A1 | * | 6/2005 | Wilson et al. | 362/259 |
| 2005/0161578 A1 | * | 7/2005 | Eckelkamp-Baker et al. | 250/201.1 |
| 2006/0139930 A1 | * | 6/2006 | Feinsod et al. | 362/276 |

* cited by examiner

*Primary Examiner*—Patrick Connolly
(74) *Attorney, Agent, or Firm*—Dickstein, Shapiro, LLP.

(57) ABSTRACT

A light-emitting apparatus, for enabling a spot of light to be projected on a desired target located a distance away such that the spot is projectable on the desired target without any or substantially any undesired movement. The apparatus may include a housing, a light generating device located within the housing and operable to generate a beam of light, a sensing device or devices for sensing an undesired action of the housing, a control circuit operable to provide a control signal corresponding to the sensed undesired action, and a drive device operable to counter act all or at least some of the undesired action of said housing in accordance with said control signal. The sensing device or devices may be one or more gyroscopes, accelerometers or other such devices.

8 Claims, 6 Drawing Sheets

MOTION-COMPENSATING LIGHT-EMITTING APPARATUS

BACKGROUND OF THE INVENTION

The present invention relates to light-emitting devices and particularly to those devices intended to produce a beam in a selected direction such as toward a target of interest. The invention provides motion-compensation technology suitable for use with such light-emitting devices, which may dampen and/or substantially eliminate the effect of unintentional motion, vibration, or movements, such as angular movements, caused by mechanical vibrations, hand tremors, and so forth.

Light-emitting devices, such as laser diode devices, are used in a variety of consumer, computer, business, medical, scientific, military, outdoor, telecommunication and industrial products, including but not limited to compact disk (CD) players and computer CD-ROM drives, digital video disk (DVD) players and DVD-ROM drives, laser printers, laser pointers, barcode scanners, measurement devices, rangefinders, scopes, industrial material processing devices, marking and cutting systems, medical equipment, fiber optic transmission systems, satellite communications, and digital printing presses. Many of these applications require precision accuracy for successful implementation. However, conventional light-emitting devices may be affected by unintentional angular movements (e.g., fine vibrations from the machine in which a laser is encased, fine tremors from a shaking hand holding a laser, etc.) and, as a result, generate an unsteady column of light—producing an effect that may cause inferior performance.

An example of the above mentioned effect will now be described with reference to a laser pointer. Fine tremors of the human hand, when holding even a lightweight laser pointer (or other pointing device), have been measured at a frequency range of 1 to 5 Hz. These unwanted vibrations are often amplified when the person maneuvering the device is nervous. The resulting deviation of the projected spot from the intended target point to the actual point is proportional to the distance from the pointing device to the target object (e.g., a point on a screen). This deviation may be approximately equal to the product of the sine or the tangent of the angle and the distance to the projected spot. In other words, for small angular movements (such as less than 10 degrees), the movement of the projected spot is approximately equal to the product of the distance to the target and the angle of the movement (in radians). For instance, small angular movements of +/−1 degree of a laser pointing device may result in movements of approximately +/−2 cm of the projected spot on a target 1 meter away; and, these angular movements will result in a 10-fold larger projected spot movement (approximately +/−20 cm) for a target 10 meters away (which may be typical of large lecture halls). In contrast to angular movements, translational movements (sideways movements of the hand) are not amplified by the distance from the light-emitting device to the target object. That is, if the hand holding a laser pointer is moved sideways by 1 cm, the spot on the target is also moved sideways by 1 cm irrespective of how far the target is from the hand. Thus, only the angular changes (particularly those in the 1 to 5 Hz frequency region, typical for a hand tremor) cause the undesirable movements of the projected light on the target.

SUMMARY OF THE INVENTION

The present invention provides a motion-compensating light-emitting apparatus which enables a steady beam of light to be projected onto a desired target even if subjected to undesired unsteady conditions by automatically redirecting or compensating for unintentional, off-target angular movements. The present apparatus may use miniature gyroscopes and/or accelerometers and/or other sensing type devices and an optical system including light-refracting elements arranged within the apparatus.

The present apparatus may be lightweight, portable, compact, inexpensive to manufacture and easy to assemble.

In one embodiment of the present invention, a motion-compensating light-emitting device is provided which utilizes two miniature gyroscopes (for example, microelectromechanical system ("MEMS") such as model ADXRS150 manufactured by Analog Devices, Inc.) arranged to measure vertical and horizontal angular movements (i.e., pitch and yaw) of the device. These gyros may have a relatively small volume (such as less than 0.15 cm$^3$), low weight (such as less than 500 mg), and small size (such as 7 mm×7 mm×3 mm or less).

In another embodiment of the present invention, a motion-compensating light-emitting device is provided which utilizes two or three miniature accelerometers (for example, MEMS, such as model ADXL203 manufactured by Analog Devices, Inc) arranged to measure acceleration and changes of the gravity vector (changes in acceleration) or relative tilts with respect to the vertical axis in two orthogonal directions (i.e., yaw and pitch) and to obtain from this information the relative vertical and horizontal angular movements. These accelerometers may have a relatively small volume 0.05 cm$^3$ (with dimensions of 0.5 cm×0.5 cm×0.2 cm). Additionally, the accelerometers may be provided in a hermetically sealed package.

In the present invention, the sensing device(s) (such as the two gyros or accelerometers) may be arranged so as to interact with an optical apparatus to cause the exiting light rays to be refracted in a compensating or opposite direction to a measured undesired angular movement or motion. For instance, if one of the gyros measures a downward tilt or undesired angular movement of the light-emitting device, then the light rays may be refracted in a proportional amount in the upward direction so as to cancel the effects of the undesired angular movement or vibration. As is to be appreciated, a similar result may also be obtained for undesired angular movements or motions in the left and/or right direction.

In the present invention, the compensating refraction may be accomplished by manipulating or sliding one or more miniature lenses into the light rays before they exit the device. In this regard, as light rays encounter the lens or lenses, they are refracted wherein the exit vergence is a function of the angle of incidence with the respective lens, the thickness and radius of curvature of such lens, and the various indices of refraction through which the light passes.

As an alternative to the above-described movable lens or lenses, two plates, which may be fabricated from glass or an equivalent type material, may be joined or arranged with a bellows and the space between the plates filled with a transparent liquid having a desired refractive index. Such arrangement may serve to refract the light rays. Here, instead of sliding a lens, the bellows may be contracted or expanded to change the angle of refraction of the light rays.

The circuitry utilized to drive the lens or bellows may be relatively simple. For example, two inverting amplifiers may be arranged to amplify the analog outputs from the MEMS gyros which may be used to form a drive signal for causing the lens or the bellows to be moved in the appropriate direction. The present invention will now be described in more complete detail with reference being made to the drawing figures, which are identified below in which corresponding components are identified by the same reference numerals.

DETAILED DESCRIPTION OF THE PREFERRED EMBODIMENTS

Figure 1:
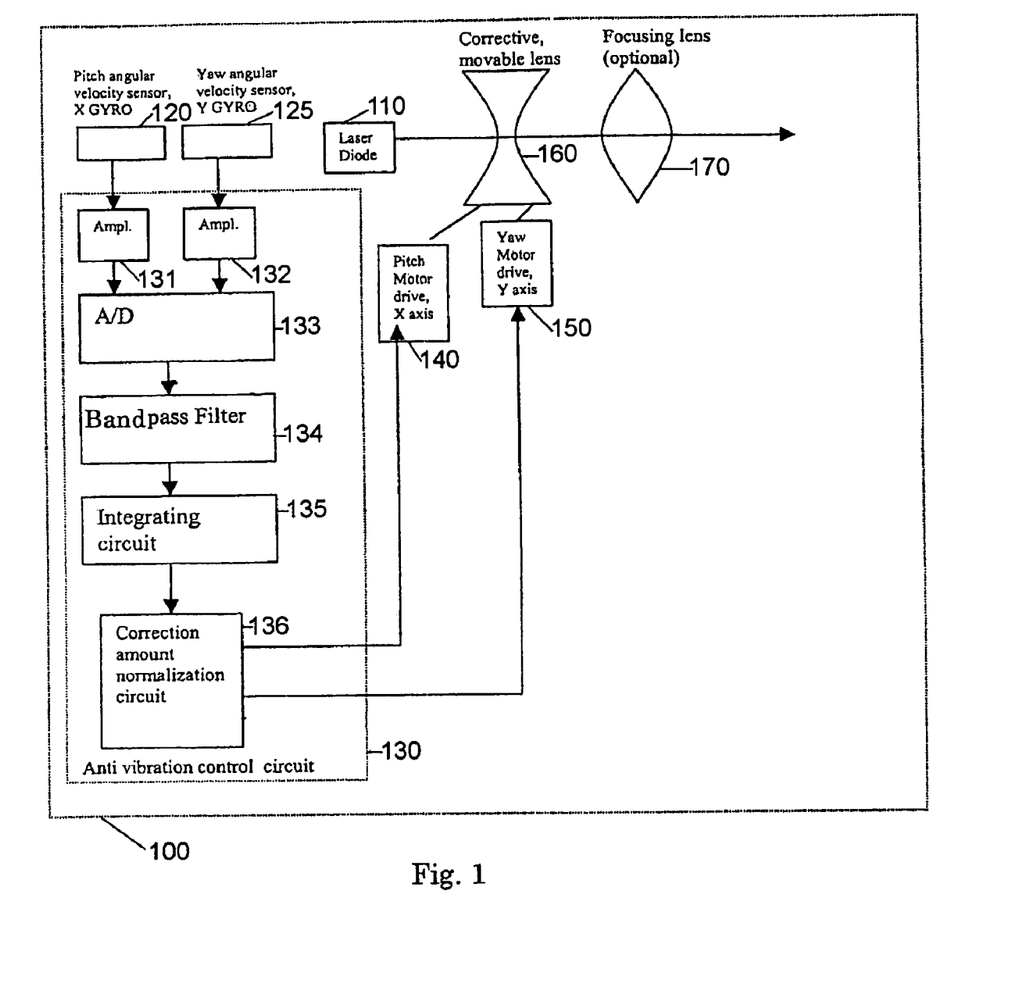
FIG. 1 is a diagram of a motion-compensating light-emitting apparatus according to an embodiment of the present invention.

FIG. 1 is a diagram of a laser diode pointer 100 which includes vibration or motion compensation circuitry in accordance with an embodiment of the invention. A visible laser diode 110 may be used as the light source. There are several ways of implementing the vibration compensation scheme. In accordance with an embodiment of the invention, two angular velocity sensors (gyros) 120 and 125 are aligned in orthogonal directions and used to measure the angular movements in the pitch and yaw axis (also referred to as the X and Y axis). The output of gyros 120 and 125 are amplified by two amplifiers 131 and 132 respectively and/or sampled by an A/D converter 133 in anti-vibration control circuit 130. The sampled signal may be passed to a band frequency filter 134 where the portion of the signal associated with the rapid, unwanted angular motions of the pointer in this example, typically that portion between 1 and 5 Hz, is extracted. Although a band frequency filter having a range of 1 to 5 Hz is described, a variable frequency filter may be used to set the desired band of frequencies. The range of frequencies may be adjusted by utilizing an adjustment type device such as a variable resistor or digital switches.

The filtered signal may then be integrated by an integrating processor circuit 135. Because gyros 120 and 125 measure angular velocity, the signal received by integrating processor circuit 135 may be integrated to obtain angular information from which an angular difference may be obtained. Although the embodiment of FIG. 1 utilizes gyros 120 and 125 that measure angular velocity, gyros 120 and 125 may measure an angular difference. In such instance, integrating processor circuit 135 may not be included in the anti-vibration control circuit 130.

The integrated rate output or angular difference (proportional to the angle of the unwanted angular motion) may be conditioned by a correction amount normalization circuit 136 (which may include amplifying the signal by a necessary or predetermined amount) and supplied as an input for motors 140 and 150, which may be connected to a movable lens 160 (which may be located between the laser diode 110 and a focusing lens 170). Movable lens 160 and focusing lens 170 may each be constructed from one or more convex lenses and/or concave lenses, or a combination of convex and concave lenses, or one or more convex/concave type lenses, or any combination thereof. The signals may be conditioned so that the feedback loops provide an input signal to the motion correction mechanisms such that the resulting circuits are stable in the region of interest. The conditioning may include adjusting the gain of the signal as well as adjusting for the null of the circuit and the zero offset of the gyros. Thus, if the integrated rate output measured is equal to 1 degree, the amplified signal has to equal a voltage (or current) that will produce a motor movement required to move the compensating lens for a one degree of motion.

The anti-vibration control circuit 130 may be part of a microprocessor or microcomputer, or could be constructed out of individual analog and digital elements depending on the cost, size and power consumption of each implementation. Additionally, an on/off switch may be provided in laser diode pointer 100 which may enable a user to turn off the anti-vibration control circuit if the user does not want to use the motion compensating function.

Figure 2:
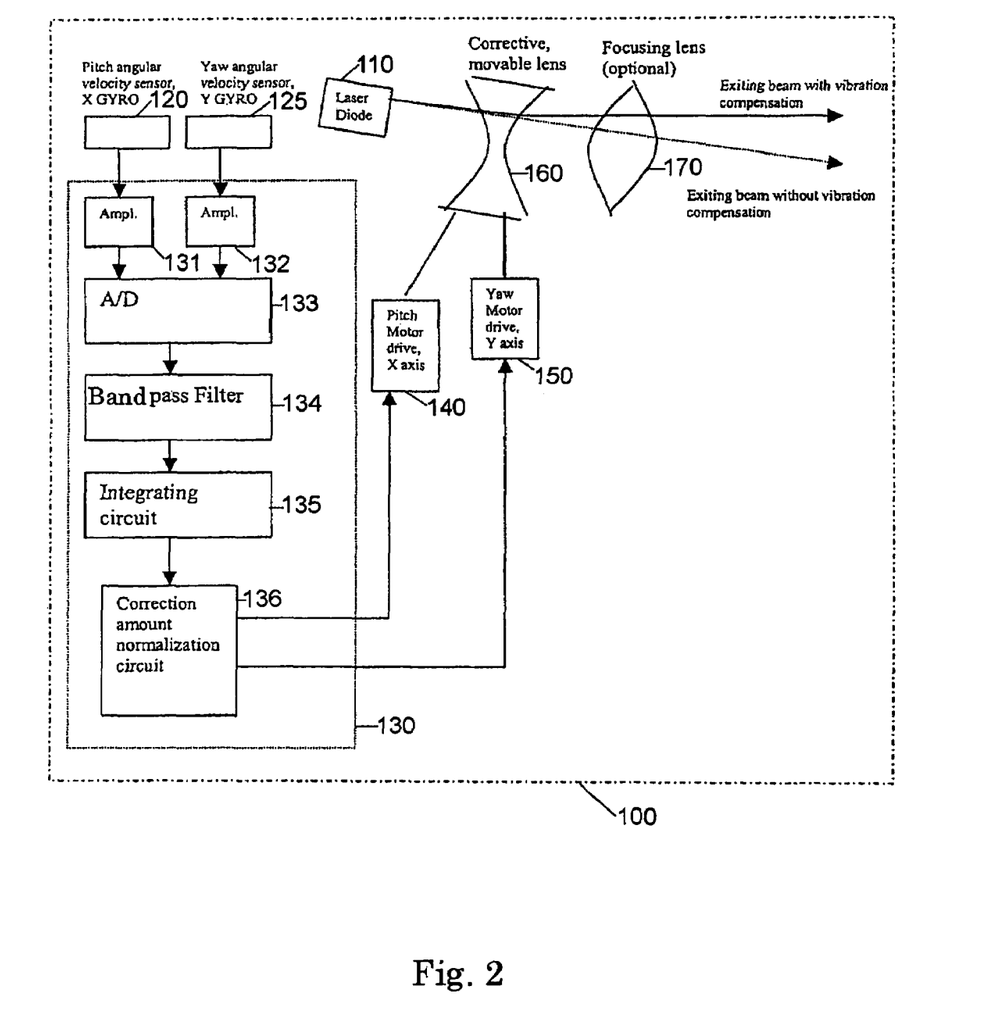
FIG. 2 is a diagram of the motion-compensating light-emitting apparatus of FIG. 1 to which reference will be made in explaining the operation thereof.

FIG. 2 is a diagram of a laser diode pointer 100 when it is tilted down. The gyros 120 and 125 may measure the angular velocity of the tilt, and their output signals (which may be in analog form) are proportional to the angular rate of the motion. Such signals may then be amplified, digitized and passed to the band pass frequency filter 134. The band frequency filter 134 may extract the portion of the signal(s) associated with rapid unwanted angular motion (e.g. unwanted hand tremors which may be in the 1 to 5 Hz range). The filtered signal may then be integrated by the integrating processor circuit 135. The normalizing and conditioning circuit 136 may receive the integrated signal and, in accordance therewith, may generate a voltage or current signal having a value or magnitude corresponding to the necessary compensation, and may cause the same to be supplied to compensating element(s) (such as motors 140 and 150). In response thereto, the motors 140 and 150 may cause the corrective lens 160 to move in a direction such that an exiting beam continues to exit the laser pointer 100 in a horizontal or a substantially horizontal direction. Without the movement of this corrective movable lens 160 the beam would exit at a downward angle. The motors 140 and 150 may be an electro-motor, an electromagnetic motor, a piezo-electric motor or any other type of actuator suited for this application.

Although not shown in this diagram, laser pointer 100 (which includes the gyros and the anti-vibration circuit) may be powered by a power source such as two 1.5V batteries connected in series as used for ordinary laser pointers. To save on power usage, the motion-compensation technology may be activated only upon activation of the laser pointer.

Although FIG. 2 depicts a laser diode pointer 100 tilted on one axis and its resulting compensation, tilting on the other axis would be compensated similarly (and independently) and is not illustrated in order to keep the drawings simple and easy to follow.

Figure 3:
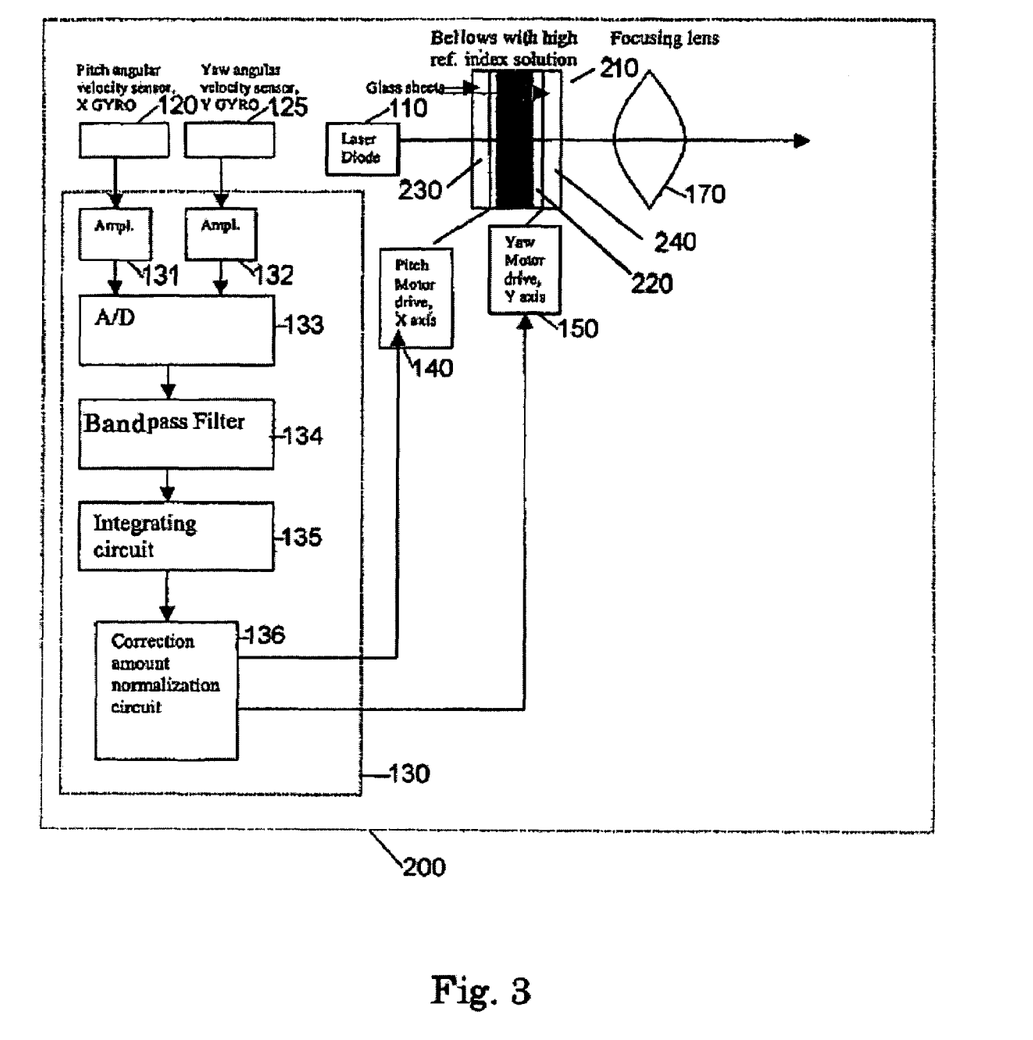
FIG. 3 is a diagram of a motion-compensating light-emitting apparatus according to another embodiment of the present invention.
Figure 4:
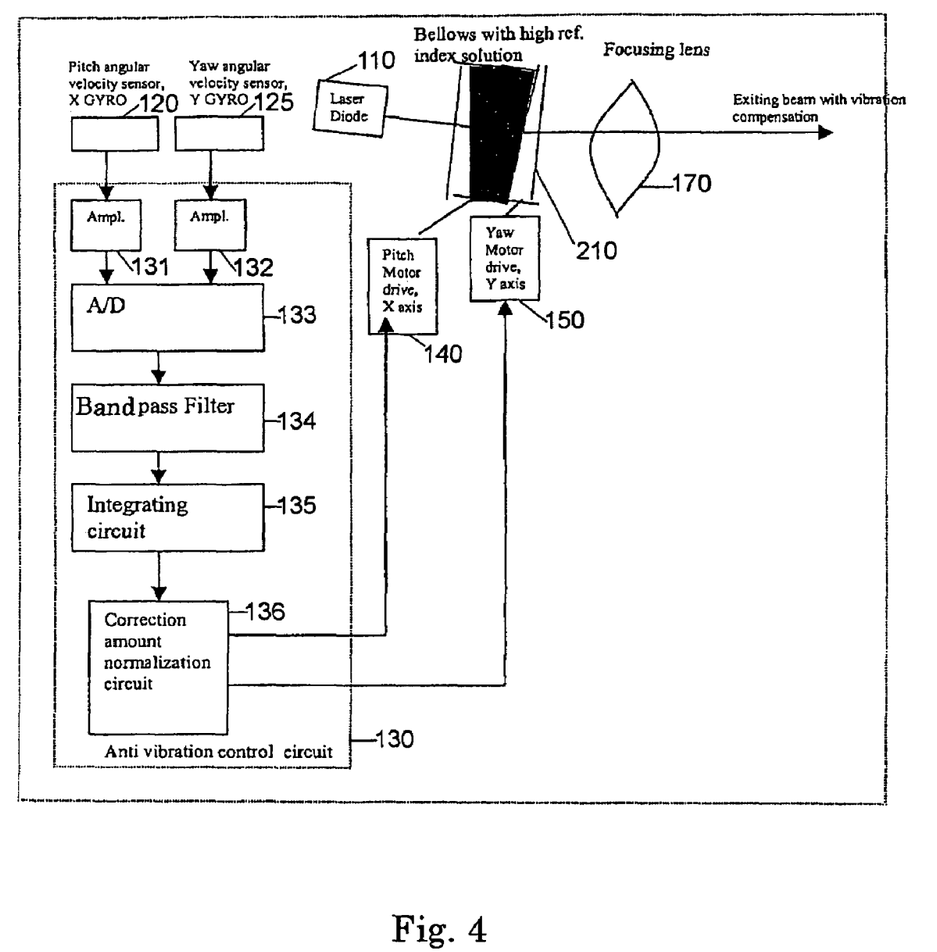
FIG. 4 is a diagram of the motion-compensating light-emitting apparatus of FIG. 3 to which reference will be made in explaining the operation thereof.

In another embodiment of the invention, and as shown in FIG. 3, a laser diode pointer 200 may use a movable bellows 210 that may be filled with a high refractive index solution or material 220 instead of corrective movable lens 160. The refractive index of the high refractive index solution or material 220 may be approximately 1.33 or higher. The high refractive index solution or material 220 may be stored between two sheets of glass 230 and 240 such that the portion of the high refractive index solution in the path of the optical beam may be adjusted (by squeezing or spreading the bellows) based on the angular rates measured by the two angular velocity sensors or gyros 120 and 125. Instead of moving an optical lens to change the direction of the exiting beam the bellows filled with high refractive index solution may be contracted on one end and expanded on the other end so as to bend the exiting light beam in a direction opposite to the unwanted motion. FIG. 4 shows how such a change in the thickness or arrangement of the bellows may cause the beam to bend so as to compensate for the unwanted motion. As in the previously described laser pointer having a movable lens, the laser pointer 200 may be powered by a power source such as a number of batteries arranged in a predetermined manner. Additionally, FIGS. 3 and 4 indicate how motion in the pitch or X axis is compensated; however, motion in the yaw or Y axis may be compensated similarly (and independently) and is not illustrated in order to keep the drawings simple and easy to follow.

Figure 5:
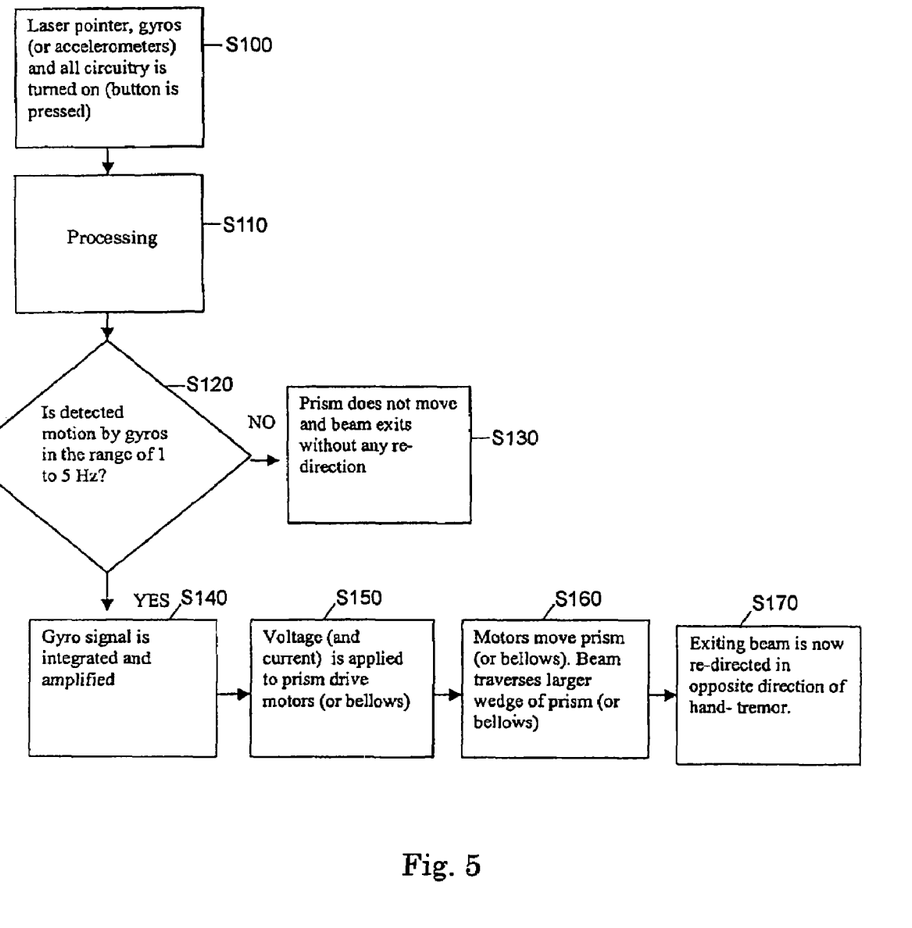
FIG. 5 is a diagram to which reference will be made in explaining the operation of the present apparatus.

FIG. 5 is a flow chart describing how a laser pointer in accordance with an embodiment of the present invention compensates for unwanted motion. The process starts in step S100 where the laser pointer is turned on by pressing a button or the like. During operation of the laser pointer, a sensing means, which may include gyros or accelerometers or a combination thereof, measure movement and output a signal which may be processed by the anti-vibration control circuit. Such processing may include the analog to digital conversion performed by the A/D converter 133. Processing may then proceed to step S120 wherein the signal may be supplied through a band pass filter so as to effectively detect and extract signals corresponding to the unwanted motion of the laser pointer (unwanted motion may be in the 1 to 5 Hz range). If the sensing means does not detect unwanted motion, the method may proceed to step S130 where the correcting lens or bellows is not moved and the beam exits the laser pointer with out any redirection. If there is unwanted motion detected by the sensing means, the method proceeds to step S140 where the processed signal may be integrated and/or amplified. A voltage or current corresponding to the processed and/or amplified signal may be applied to the drive motors in step S150, which in turn, may move the prism or the bellows in step S160. In step S170, the beam may be redirected in the direction opposite the direction of the hand tremor.

Figure 6:
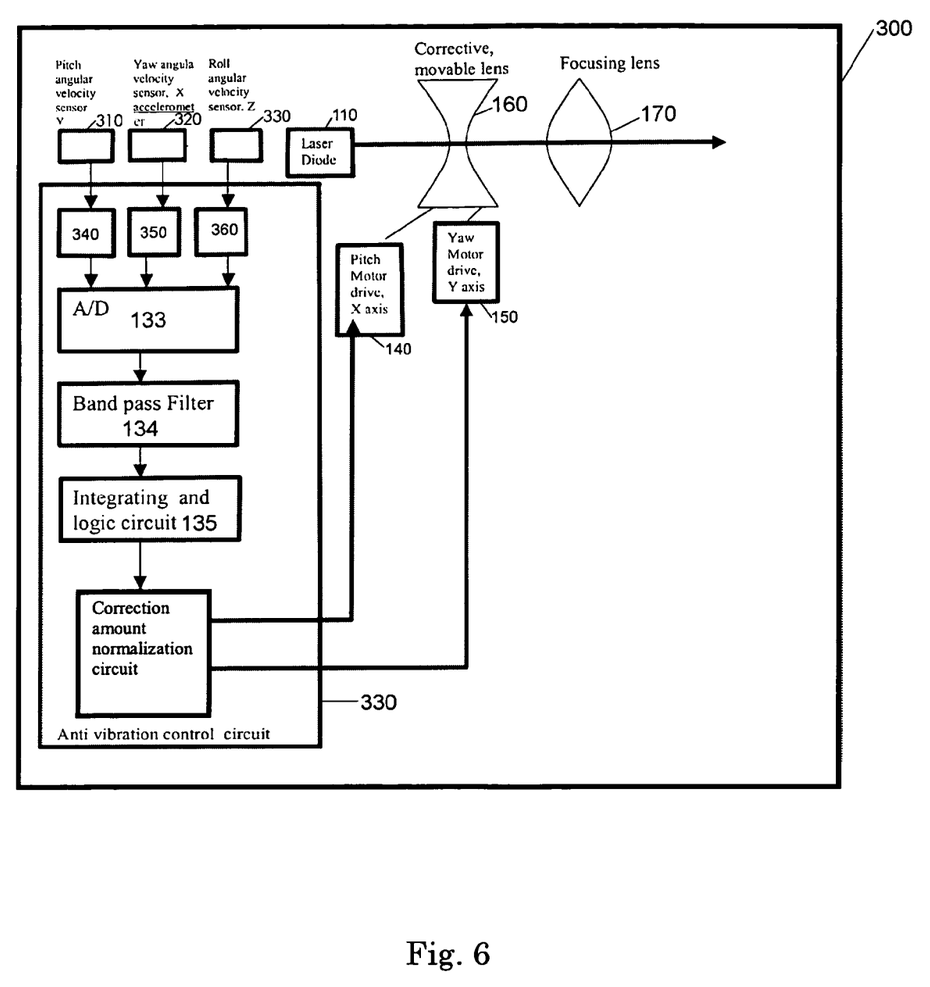
FIG. 6 is a diagram of a motion-compensating light-emitting apparatus according to another embodiment of the present invention.

FIG. 6 is a diagram of another embodiment of the laser diode pointer 300 wherein accelerometers are utilized instead of gyroscopes. Three angular velocity sensors (accelerometers) 310, 320, and 330, which may be aligned in orthogonal directions, may be used to measure the angular movements in the pitch, yaw and roll axis (also referred to as the X, Y and Z axis) respectively. The output of accelerometers 310, 320, and 330 may be respectively amplified by three amplifiers 340, 350, and 360, and then sampled by A/D converter 133 in the anti-vibration control circuit 330. The portion of the signal associated with rapid unwanted angular motions of the pointer (e.g., an unwanted hand tremor in the 1-5 Hz range) may be extracted by band pass filter 134 and integrated by integrating processor circuit 135. Movements (tilts) of the laser pointer may be measured by comparing the measured acceleration to a gravity vector (g acceleration) as the laser pointer is tilting and/or computing the motions from the three orthogonal measurements of the acceleration.

The computed integrated rate output (proportional to the angle of the unwanted angular motion) may be conditioned (which may include amplifying the signal by a necessary or predetermined amount) and/or used as the input for motor(s) that may be coupled to movable lens 160 located between the laser diode 110 and the focusing lens 170. The anti-vibration circuit 330 may be included in a microprocessor or microcomputer or may be constructed out of individual analog and/or digital elements depending on the cost, size and power consumption requirements.

Although the above embodiments describe laser pointers that may utilize specific combinations of gyroscopes or accelerometers, the present invention is not so limited. For example, the present invention may also utilize other types of sensing devices or may utilize a different number of gyroscopes or accelerometers or may utilize a combination of gyroscopes and accelerometers to sense unwanted motion. Although preferred embodiments of the present invention and modifications thereof have been described in detail herein, it is to be understood that this invention is not limited to those precise embodiments and modifications, and that other modifications and variations may be effected by one skilled in the art without departing from the spirit and scope of the invention as defined by the appended claims.

What is claimed is:

1. A light-emitting apparatus comprising:

generating means for generating a beam of light;

sensing means for sensing an undesired action of the generating means, wherein the sensing means includes one or more rate-sensing gyroscopes so that each gyroscope provides an output signal indicative of an angular velocity; and compensating means for compensating for the sensed undesired action so that the beam of light is projected on a target without any or substantially any undesired movement, wherein the compensating means includes integrating means for integrating angular velocity signal derived from the one or more gyroscopes to provide an integrated signal indicative of an undesired angular movement of the generating means;

wherein the compensating means further includes a movable bellows positioned such that the beam of light generated by the generating means passes there through and having a solution therein with a refractive index of at least a predetermined value, and means for moving the bellows an amount which relates to the integrated signal so that the generated beam of light is projectable on the target without any or substantially any of the undesired movement.

2. The light-emitting apparatus of claim 1, wherein said predetermined value is approximately 1.33 or higher.

3. A laser pointer apparatus usable by an operator for enabling a spot of light to be projected on a desired target located a distance away from the operator, said apparatus comprising:

a housing;

generating means located within said housing for generating a beam of light;

sensing means for sensing an undesired action of said housing;

control means for providing a control signal corresponding to the sensed undesired action; and counter acting means for counter acting all or at least some of the undesired action of said housing in accordance with said control signal so that the spot is projected on the desired target without any or substantially any undesired movement;

wherein the counter acting means includes a movable bellows positioned such that the beam of light generated by the generating means passes there through and having a solution therein with a refractive index of at least a predetermined value, and means for moving the bellows an amount which relates to the control signal.

4. The laser pointer apparatus of claim 3, wherein said predetermined value is approximately 1.33 or higher.

5. A light-emitting apparatus comprising:
a light generating device which is operable to generate a beam of light;
a sensing device operable to sense an undesired action of the generating device, wherein the sensing device includes one or more rate-sensing gyroscopes, so that each gyroscope provides an output signal indicative of an angular velocity; and
a compensating circuit operable to compensate for the sensed undesired action so that the beam of light is projected on a target without any or substantially any undesired movement,
wherein the compensating circuit includes an integrator operable to integrate an angular velocity signal derived from the one or more gyroscopes to provide an integrated signal indicative of an undesired angular movement of the generating device; and
wherein the the compensating circuit further includes a movable bellows positioned such that the beam of light generated by the generating device passes there through and having a solution therein with a refractive index of at least a predetermined value, and a motor device operable to move the bellows an amount which relates to the integrated signal so that the generated beam of light is projectable on the target without any or substantially any of the undesired movement.

6. The light-emitting apparatus of claim 5, wherein said predetermined value is approximately 1.33 or higher.

7. A laser pointer apparatus usable by an operator for enabling a spot of light to be projected on a desired target located a distance away from the operator, said apparatus comprising:
a housing;
a light generating device located within said housing operable to generate a beam of light;
a sensing device for sensing an undesired action of said housing;
a control circuit operable to provide a control signal corresponding to the sensed undesired action; and
a drive device operable to counter act all or at least some of the undesired action of said housing in accordance with said control signal so that the spot is projected on the desired target without any or substantially an undesired movement; and
a movable bellows positioned such that the beam of light generated by the generating device passes there through and having a solution therein with a refractive index of at least a predetermined value, and wherein the drive device is operable to move the bellows an amount which relates to the control signal.

8. The laser pointer apparatus of claim 7, wherein said predetermined value is approximately 1.33 or higher.

* * * * *

UNITED STATES PATENT AND TRADEMARK OFFICE
CERTIFICATE OF CORRECTION

PATENT NO. : 7,312,863 B2  Page 1 of 1
APPLICATION NO. : 11/022215
DATED : December 25, 2007
INVENTOR(S) : Matthew Feinsod It is certified that error appears in the above-identified patent and that said Letters Patent is hereby corrected as shown below:

In Claim 5, Column 7, line 26, please delete "the the" and replace with --the--.

In Claim 7, Column 8, at line 20, delete "an".

Signed and Sealed this

Third Day of June, 2008

JON W. DUDAS
*Director of the United States Patent and Trademark Office*